(12) United States Patent
Tanoue

(10) Patent No.: US 8,050,785 B2
(45) Date of Patent: Nov. 1, 2011

(54) APPARATUS AND METHOD FOR HANDLING ORDERS

(75) Inventor: Mitsuteru Tanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 402 days.

(21) Appl. No.: 12/358,845

(22) Filed: Jan. 23, 2009

(65) Prior Publication Data

US 2009/0198362 A1 Aug. 6, 2009

(30) Foreign Application Priority Data

Jan. 31, 2008 (JP) .................................. 2008-021935

(51) Int. Cl.
*G06F 19/00* (2006.01)
*G06Q 10/00* (2006.01)
(52) U.S. Cl. ......... 700/97; 700/107; 705/7.11; 705/7.12
(58) Field of Classification Search ............... 700/97, 700/107; 705/7.11, 7.12
See application file for complete search history.

(56) References Cited

U.S. PATENT DOCUMENTS

| | | | | |
|---|---|---|---|---|
| 4,945,488 | A * | 7/1990 | Carver et al. ................ | 700/182 |
| 5,101,352 | A * | 3/1992 | Rembert ...................... | 705/7.26 |
| 6,804,880 | B2 * | 10/2004 | Yamamoto ................... | 29/700 |
| 7,840,432 | B2 * | 11/2010 | Lamb, III .................... | 705/7.11 |
| 2010/0217422 | A1 * | 8/2010 | Takahashi .................... | 700/107 |

FOREIGN PATENT DOCUMENTS

| | | |
|---|---|---|
| JP | 1995044609 A | 2/1995 |
| JP | 2000331052 A | 11/2000 |
| JP | 2001331535 A | 11/2001 |
| JP | 2003058225 A | 2/2003 |
| JP | 2004192352 A | 7/2004 |
| JP | 2005100041 A | 4/2005 |
| JP | 2009181490 A | 8/2009 |
| WO | 2009047890 A | 4/2009 |

OTHER PUBLICATIONS

Japanese Office Action for JP2008-021935 issued Oct. 13, 2009.

* cited by examiner

*Primary Examiner* — Kidest Bahta
*Assistant Examiner* — Silvalingam Sivanesan

(57) ABSTRACT

Order handling apparatus of the present invention stores assembly standard information that at least one component is managed for each assembly and component standard information which is basic information of a component to be mapped with each other. Order handling apparatus duplicates component standard information together with assembly standard information to generate individual assembly information for arranging an assembly, assigns arranging formation representing whether a component is arranged or not to generate individual component information and stores them. Order handling apparatus determines whether to reflect an update of component standard information in component standard information contained in individual assembly information based on arranging information when component standard information stored in standard assembly storing unit is updated.

10 Claims, 4 Drawing Sheets

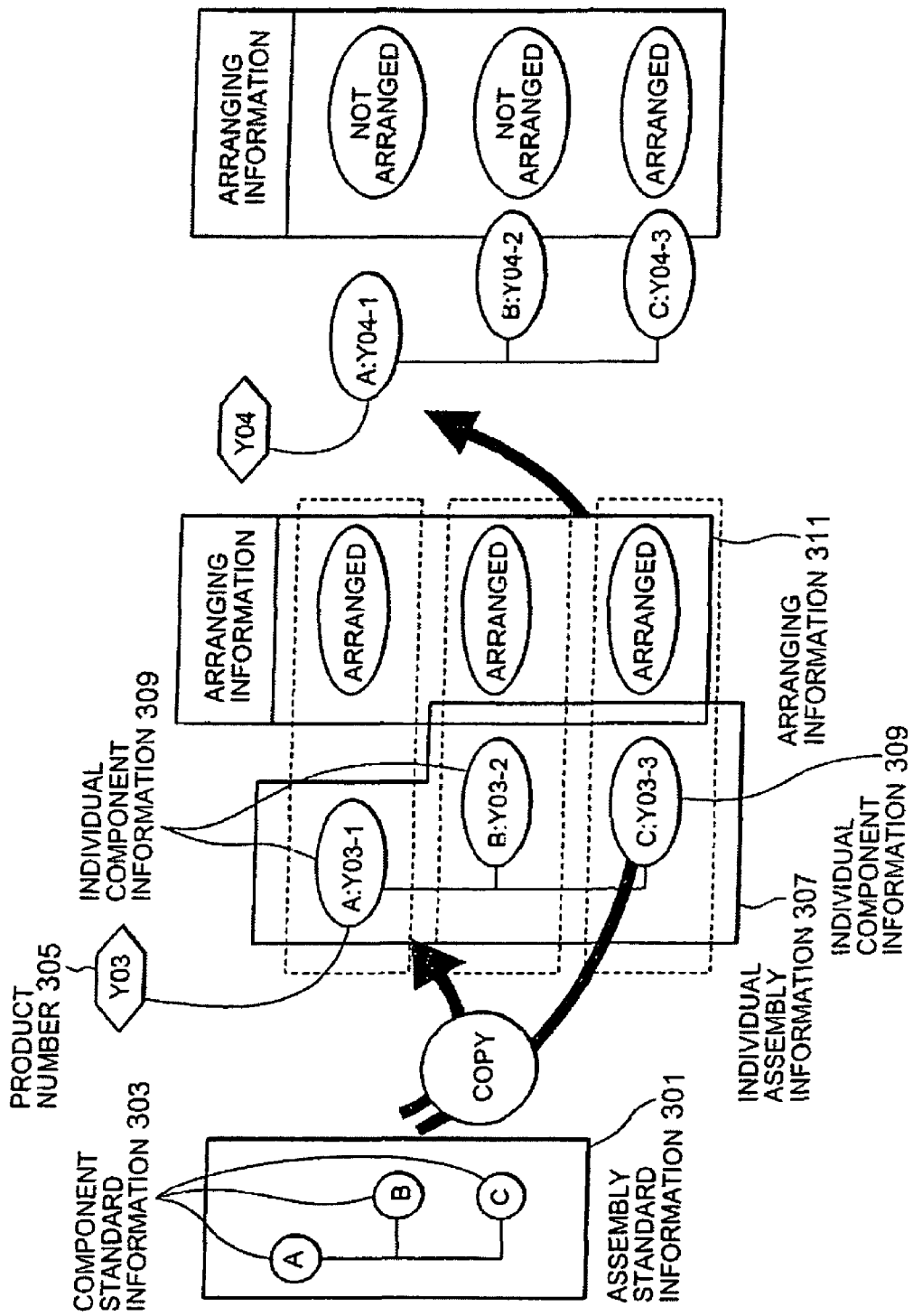

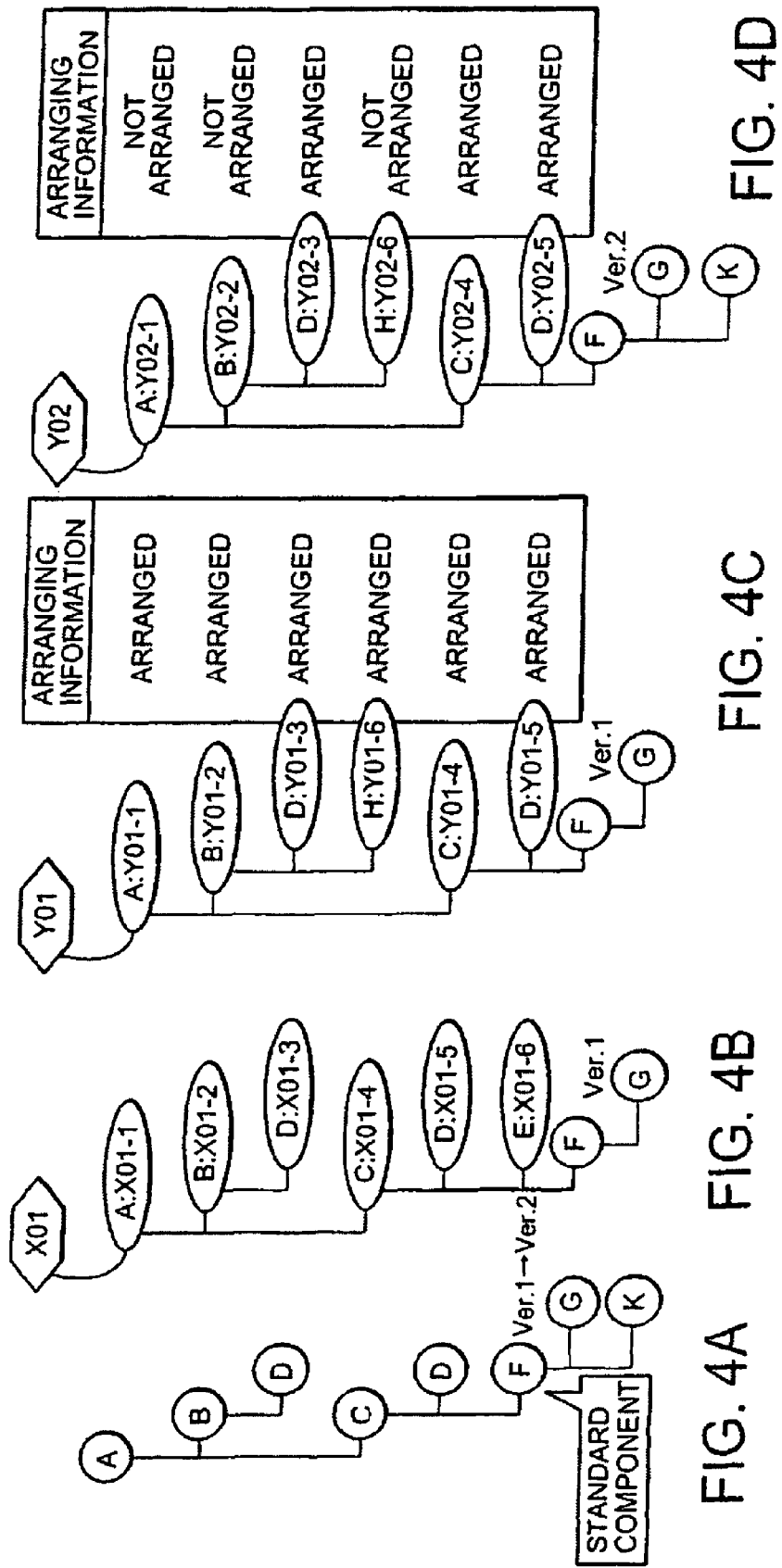

APPARATUS AND METHOD FOR HANDLING ORDERS

This application is based upon and claims the benefit of priority from Japanese Patent Application No. 2008-021935 filed on Jan. 31, 2008, the content of which is incorporated by reference.

BACKGROUND OF THE INVENTION

The present invention relates to an apparatus and a method for handling orders in which an individual order product having at least one component is managed for each assembly of components.

Conventionally, electric device manufactures manage parts data by using a production management system. The manufacturers standardize parts or place an order for parts to develop a new product.

For this reason, as related arts, JP-A No. 2000-331052 discloses a product data management (PDM) system for managing configuration information of a product. The PDM system can easily secure consistency of edit information when cooperating with other systems. According to Patent Document 1, the PDM system records configuration information of respective parts which constitute a product in a tree form.

JP-A No. 2001-331535 discloses a component table data integrating apparatus which edits component table data created by a three-dimensional computer aided design (CAD) and component table data created by a two-dimensional CAD. According to JP-A No. 2001-331535, the component table data integrating apparatus integrates 3D component table data and 2D component table data which are edited to thereby create integrated component table data by using a user interface through a tree view.

JP-A No. 2004-192352 discloses plural systems in which production configuration management and production arrangement are separately performed. According to JP-A No. 2004-192352, a product configuration management system (PDM data system) which creates and manages arrangement information and component configuration information and a production arrangement system (enterprise resource planning (ERP)) which performs a deadline setting and progress management are provided. Further, a linkage system which links the PDM system and the ERP system is provided. The system creates arrangement information of a component and associates arrangement information with component configuration information.

JP-A No. H07-044609 discloses a design update application control system which automatically and reasonably determines the application of the design update of products. According to JP-A No. H07-044609, an application rule of a design update is registered in a form that can be processed by a computer.

An individual order product is relatively high in price, and it takes a long time to complete a product from an order. As competition between companies grows heated, it is required to produce and deliver a product in a short term and at a low price.

In order to solve the above problem, there is a method for arranging some components before basic design is completed. Meanwhile, a specification of a product is sometimes updated by a customer's intention after basic design is completed. In this instance, even though components are equal in basic design, components are arranged in advance in some products, and components are arranged after design updates in other products. As a result, there is a need that when updating of a design is determined, that should be reflected in components which are not arranged in advance and should not be reflected in components that are arranged in advance.

SUMMARY OF THE INVENTION

An object of the present invention is to provide an apparatus and a method for handling orders that cope with a specification update of a product and efficiently manage advance arrangement of components in producing individual order products.

According to one aspect of the present invention, an apparatus for handling orders is provided which includes:

a standard assembly storing unit for storing at least one assembly standard information of assembly for products and at least one component standard information of component for the each assembly; a assembly information generating unit for generating assembly information for arranging the assembly, the assembly information including assembly standard information and component standard information copied from the standard assembly storing unit; a component information generating unit for generating component information of component in the assembly information, the component information including component standard information and arranging information, the arranging information showing whether the component is arranged; a assembly storing unit for storing the assembly information of the assembly and the component information of the assembly; and a determining unit for determining whether the updates of the component standard information stored in standard assembly storing unit reflect into the component standard information in the assembly information based on the arranged information in case the component standard information stored in standard assembly storing unit is updated.

According to one aspect of the present invention, a method for handling orders is provided which includes:

collecting at least one assembly standard information of assembly for products and at least one component standard information of component for each of the assemblies; generating assembly information for arranging the assembly, the assembly information including the assembly standard information and the component standard information; generating component information in the assembly information, the component information including component standard information and arranging information, the arranging information showing whether the component is arranged;

collecting the assembly information and the component information; and determining whether the updates of collected component standard information reflect into the component standard information in the assembly information based on the arranged information in case the collected component standard information is updated.

According to one aspect of the present invention, a computer readable medium recording thereon a program for enabling computer to execute;

collecting at least one assembly standard information of assembly for products and at least one component standard information of component for each of the assemblies; generating assembly information for arranging the assembly, the assembly information including the assembly standard information and the component standard information; generating component information in the assembly information, the component information including component standard information and arranging information, the arranging information showing whether the component is arranged; collecting the assembly information and the component information; and determining whether the updates of collected component standard information reflect into the component standard information in the assembly information based on the arranged information in case the collected component standard information is updated.

BRIEF DESCRIPTION OF THE DRAWINGS

Other features and advantages of the invention will be made more apparent by the following detailed description and the accompanying drawings, wherein:

FIG. 3A shows one example of a data structure stored in standard assembly storing unit according to the exemplary embodiment of the present invention;

FIG. 3B shows one example of a data structure stored in individual assembly storing unit according to the exemplary embodiment of the present invention;

FIG. 3C shows one example of a data structure stored in standard assembly storing unit according to the exemplary embodiment of the present invention;

FIGS. 4A to 4D show an effect of order handling apparatus according to the exemplary embodiment of the present invention.

In the drawings, the same reference numerals represent the same structural elements.

DETAILED DESCRIPTION OF THE PREFERRED EMBODIMENTS

A first embodiment of the present invention will be described in detail below.

Figure 1:
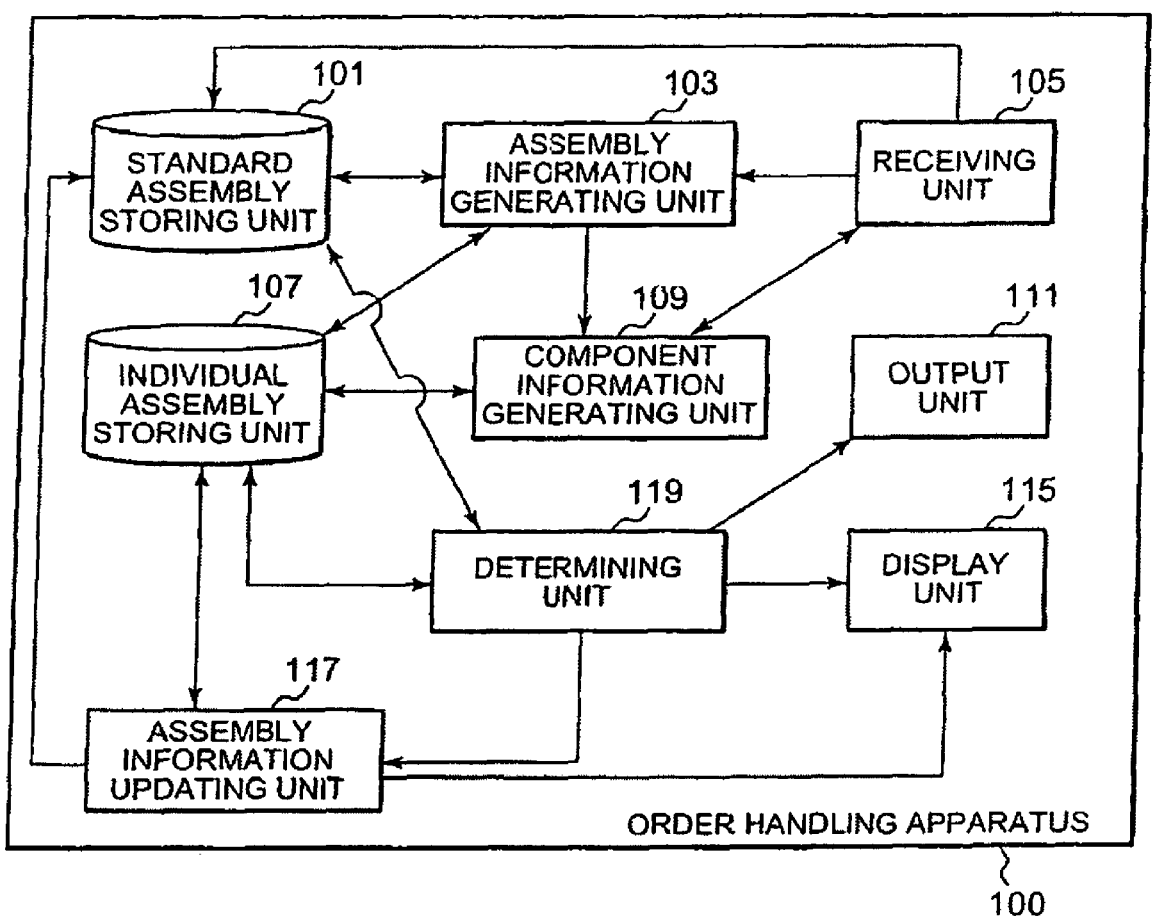
FIG. 1 is a block diagram illustrating order handling apparatus according to an exemplary embodiment of the present invention.

FIG. 1 is a block diagram illustrating a configuration of order handling apparatus 100 according to an exemplary embodiment of the present invention. Order handling apparatus 100 according to the exemplary embodiment of the present invention manages an individual order product having plural components for each assembly of components.

Order handling apparatus 100 includes standard assembly storing unit 101 which stores assembly standard information for each of plural assemblies which constitute an individual order product, and component standard information for each of plural components which constitute an assembly to be mapped with each other, assembly information generating unit 103 which duplicates component standard information together with assembly standard information to generate individual assembly information for arranging an assembly, component information generating unit 109 which assigns arranging information representing whether a component is arranged or not to component standard information contained in individual assembly information to generate individual component information, individual assembly storing unit 107 which stores individual component information together with individual assembly information, and determining unit 119 which determines whether to reflect an update of component standard information in component standard information contained in individual assembly information or not based on arranging information when component standard information stored in standard assembly storing unit 101 is updated.

In detail, order handling apparatus 100 includes standard assembly storing unit 101, assembly information generating unit 103, receiving unit 105, individual assembly storing unit 107, component information generating unit 109, output unit 111, display unit 115, determining unit 119, assembly information updating unit 117, and determining unit 119.

Order handling apparatus 100 is configured by hardware constituted by ordinary devices such as a central processing unit (CPU), a read only memory (ROM), a random access memory (RAM), and an interface (I/F) assembly, a dedicated logic circuit constituted to execute predetermined data processing, or a combination thereof, to read out a computer program to execute corresponding data processing.

Standard assembly storing unit 101 stores assembly standard information and component standard information to be mapped with each other. Assembly standard information is basic information about an assembly of an individual order product. Component standard information is basic information about a component. Assembly standard information and component standard information are inputted by a user through receiving unit 105. Identification information such as a component number is assigned to assembly standard information and component standard information.

"Component" means a component of a minimum unit used as a single piece in a production site. For example, a component means a press component, a bolt, a nut, and so on. An assembly which is produced and delivered with plural components in a certain site may be used as a minimum unit component in any other production site. "Individual order product" is formed and shipped with plural assemblies or components. An individual order product is, for example, a home appliance provided to a customer. However, an individual order product shipped in a certain production site may be used as a component or an assembly in any other site. An assembly may be produced with one or plural components or may be produced with one or plural assemblies which are already produced. An assembly may be produced with one or plural assemblies and components which are already produced. An individual ordered product may be produced with one or plural assemblies or with one or plural assemblies and components.

FIG. 3 is a view illustrating a data structure stored in order handling apparatus 100 according to the exemplary embodiment of the present invention. FIG. 3A shows a data structure stored in standard assembly storing unit 101. Particularly, FIG. 3A shows a data structure of assembly standard information 301 of a standard assembly of a component number A. A standard component assembly of a component number A is configured from components of a component number B and a component number C. As shown in FIG. 3A, assembly standard information 301 and component standard information 303 are stored in a tree structure form. Since assembly standard information 301 is configured in a tree structure form, assembly standard information 301 can include structure information which represents an assembly structure of components.

Returning to FIG. 1, receiving unit 105 receives arranging information for each component standard information together with a duplication instruction of assembly standard information from a user. Assembly information generating unit 103 duplicates component standard information together with assembly standard information to generate individual assembly information for arranging an assembly.

If assembly standard information contains structure information representing an assembly structure of components, assembly information generating unit 103 can duplicate structure information to generate individual assembly information. Also, assembly information generating unit 103 assigns assembly identification information for identifying individual assembly information to generate individual assembly information.

Component information generating unit 109 assigns arranging information representing whether a component is arranged or not to component standard information contained in individual assembly information to generate individual component information. Here, "arranging information" includes information representing arrangement completion and information representing "not arranged". Arranging information may include information representing arrangement preparation. For example, as arranging information, "1" is set for "arranged", and "0" is set for "not arranged". "arrangement" means a procedure for placing an order to a factory which produces components or for placing an order to a store or firm which imports and sells components.

Component information generating unit 109 may assign component identification information for identifying individual component information to component standard information to generate individual component information. Component information generating unit 109 may assign component identification information to some of plural component standard information corresponding to assembly standard information. For example, individual component information to which component identification information is assigned can be identified as a component (hereinafter, configuration-dedicated component) produced for each product number. Meanwhile, individual component information to which component identification information is not assigned can be identified as a standard component which does not relate to a product number. A configuration-dedicated component means a component that a design is updated depending on a customer's desire, and a standard component means a general-purpose component which can be mass-produced.

Individual assembly storing unit 107 stores individual component information together with individual assembly information. FIG. 3B shows a data structure stored in individual assembly storing unit 107. Particularly, FIG. 3B shows an assembly of components which constitute a part of an individual order product of a product number Y03. Assembly information generating unit 103 generates assembly standard information 301 in a tree structure form shown in FIG. 3A. Individual assembly information 307 is generated such that assembly standard information 301 and component standard information 303 which are generated are duplicated. In individual assembly information 307, arranging information 311 is assigned to component standard information 303 contained in individual assembly information 307. Accordingly, individual component information 309 is generated. "Y03-1" is assigned to an assembly of a component number A as assembly identification information. Assembly identification information is configured by a combination of a product number "Y03" for identifying an individual order product and a disposition number "1" in an assembly. An assembly Y03-1 corresponds to a component at a point of view of an assembly (or individual order product) configured by the assembly Y03-1. In this instance, Y03-1 functions as component identification information. Component identification information is assigned to individual component information of component numbers B and C. These are identified as a configuration-dedicated component.

In FIG. 3B, arranging information 311 representing arrangement completion is assigned to assembly standard information of a component number A, component standard information of a component number B, and component standard information of a component number C. FIG. 3C shows an assembly of Components which constitute a part of an individual order product of a product number Y04. Arranging information representing "arranged" is assigned to a component of a component number C, but arranging information representing "not arranged" is assigned to a component of a component number B.

Returning to FIG. 1, receiving unit 105 may receive an update of component standard information of product standard information. An update of component standard information received can be reflected in component standard information stored in standard assembly storing unit 101.

Determining unit 119 determines whether to reflect an update of component standard information or not. That is, determining unit 119 determines whether to reflect an update of component standard information in component standard information contained in individual assembly information or not based on arranging information when component standard information stored in standard assembly storing unit 101 is updated. If arranging information represents that a component is not arranged (e.g., when it is set to "0"), determining unit 119 determines that there is a need for reflecting an update of component standard information. To the contrary, if arranging information represents that a component is completely arranged (e.g., when it is set to "1"), determining unit 119 determines that there is no need for reflecting an update of component standard information.

An operation of determining unit 119 which determines that component standard information stored in standard assembly storing unit 101 has been updated will be described below. Standard assembly storing unit 101 stores component standard information to be mapped with version information which represents the number of times that component standard information is updated. Assembly information generating unit 103 duplicates assembly standard information together with version information of component standard information to generate individual assembly information. Individual assembly storing unit 107 stores individual assembly information generated. Accordingly, individual assembly information stored in individual assembly storing unit 107 contains component standard information which is mapped with version information. Therefore, determining unit 119 can determine that component standard information stored in standard assembly storing unit 101 has been updated, based on version information.

For example, if component standard information stored in standard assembly storing unit 101 is updated, version information is updated such that it is increased. Determining unit 119 extracts assembly standard information having the same component number from standard assembly storing unit 101 and individual assembly storing unit 107. Subsequently, determining unit 119 compares version information of component standard information corresponding to assembly standard information extracted from standard assembly storing unit 101 to version information of component standard information corresponding to assembly standard information extracted from individual assembly storing unit 107. If a number of version information of component standard information stored in standard assembly storing unit 101 is greater than a number of version information of component standard information stored in individual assembly storing unit 107, determining unit 119 determines that version information of component standard information stored in standard assembly storing unit 101 has been updated.

Meanwhile, if a number of version information of component standard information stored in individual assembly storing unit 107 is greater than a number of version information of component standard information stored in standard assembly storing unit 101, determining unit 119 determines that version information of component standard information stored in individual assembly storing unit 107 has been updated.

After an update of component standard information is detected, determination as to whether to update or not may be performed at predetermined timing. Therefore, an update may not be reflected in a component that arrangement preparation is already completed.

If determining unit 119 determines to reflect an update of component standard information, assembly information updating unit 117 reflects an update of component standard information stored in standard assembly storing unit 101 in component standard information of individual assembly information. Assembly information updating unit 117 may set timing for reflecting an update in advance and so may reflect an update at predetermined timing.

Assembly information updating unit 117 may display a query representing whether to reflect an update or not on display unit 115 and may reflect an update with a user's consent. At this time, assembly information updating unit 117 may display a list of individual assembly information, which is a target of determination as to whether to reflect or not, on display unit 115. A user may select individual assembly information in which an update should be reflected from a list and may instruct to reflect an update.

Display unit 115 has, for example, a touch panel function. This makes it possible for display unit 115 to receive an instruction of a user. A received instruction is transmitted to assembly information updating unit 117, and assembly information updating unit 117 updates component standard information of selected individual assembly information based on an instruction of a user.

Respective components of order handling apparatus 100 described above can be constructed by using various hardware. And also, computer program in the order handling system 100 realize above functions using the components.

Such a computer program is software for executing, by a central processing unit, processing operations such as standard assembly storing processing which stores assembly standard information which is basic information of an assembly of an individual order product that plural component are managed for each assembly and component standard information which is basic information of a component to be mapped with each other, assembly information generating processing which duplicates component standard information together with assembly standard information to generate individual assembly information for arranging an assembly, component information generating processing which grants arranging information representing whether a component is arranged or not to component standard information contained in individual assembly information to generate individual component information, individual assembly storing processing which stores individual component information together with individual assembly information, and determining processing which determines whether to reflect an update of component standard information in component standard information contained in individual assembly information or not based on arranging information when component standard information stored in standard assembly storing processing is updated, and such a computer program is stored in an information storage medium such as random access memory (RAM).

Figure 2:
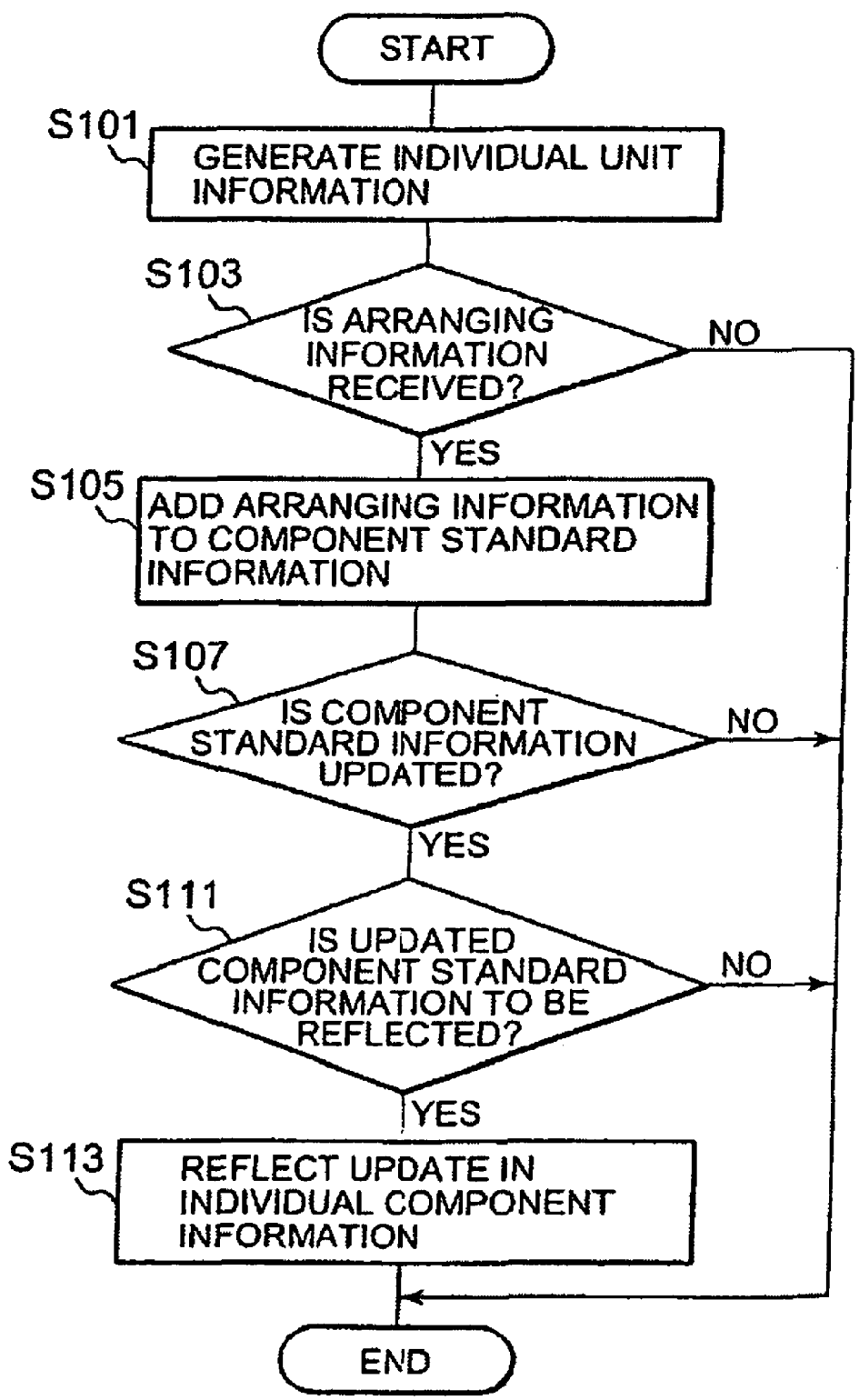
FIG. 2 is a flowchart illustrating an order handling method executed by order handling apparatus according to the exemplary embodiment of the present invention.

In the above-described configuration, an order handling method by order handling apparatus 100 according to the exemplary embodiment of the present invention will be described below. FIG. 2 is a flowchart illustrating an order handling method executed by order handling apparatus 100 according to the exemplary embodiment of the present invention. Order handling apparatus 100 duplicates component standard information together with assembly standard information stored in standard assembly storing unit 101 to generate individual assembly information (S101). If receiving unit 105 receives arranging information (S103Y), order handling apparatus 100 assigns arranging information to component standard information contained in individual assembly information to generate individual component information (S105). Order handling apparatus 100 stores generated individual assembly information together with individual component information. If it is determined that component standard information stored in standard assembly storing unit 101 has been updated (step S107Y), it is determined based on arranging information whether to reflect updated component standard information or not (S111). If it is determined to reflect an update (S111Y), order handling apparatus 100 reflects an update of component standard information in individual component information (S113). Meanwhile, if arranging information indicates that a component is completely arranged, order handling apparatus 100 determines not to reflect updated component standard information (S111N). Also, if receiving unit 105 does not receive arranging information (S103N) or if it is determined that component standard information stored in standard assembly storing unit 101 has not been updated (S107N), order handling apparatus 100 does nothing.

Returning to FIG. 1, the above operation will be described in more detail with reference to FIG. 3. For example, in standard assembly storing unit 101, when component standard information 303 of a component number B contained in assembly standard information 301 of a component number A is updated, determining unit 119 extracts individual assembly information 307 having assembly standard information of a component number A. In an example of FIG. 2, individual assembly information 307 identified by Y03-1 and individual assembly information 307 identified by Y04-1 are extracted. Also, determining unit 119 extracts individual component information 309 containing updated component standard information 303 of a component number B contained in extracted individual assembly information 307. Determining unit 119 determines an arranging state of a component with reference to arranging information 311 contained in individual component information 309. As a result, a component identified by Y03-2 is determined as "arranged", and a component identified by Y04-2 is determined as "not arranged". Therefore, determining unit 119 determines not to reflect an update of component standard information of a component number B in a component identified by Y03-2. To the contrary, determining unit 119 determines to reflect an update of component standard information of a component number B in a component identified by Y04-2.

Assembly information updating unit 117 may receive an update request of individual assembly information together with assembly identification information. Such an update is received from a user through receiving unit 105 and is transmitted to assembly information updating unit 117. Assembly information updating unit 117 extracts individual assembly information corresponding to received assembly identification information from individual assembly storing unit 107. Assembly information updating unit 117 updates extracted individual assembly information according to a received update request. As described above, a user can directly design-updates individual assembly information. Order handling apparatus 100 may extract individual assembly information corresponding to received assembly identification information and may display it on display unit 115. Accordingly, a user can request an update of individual assembly information while confirming a content of individual assembly information displayed on display unit 115.

As described above, component information generating unit 109 assigns component identification information for identifying individual component information to component standard information to generate individual component information. The update request includes an update request of component standard information related to component identification information. Assembly information updating unit 117 updates component standard information of individual assembly information corresponding to received assembly identification information according to such an update request. Therefore, assembly information updating unit 117 specifies component standard information to be updated among extracted individual assembly information and updates component standard information according an update request of received component standard information.

Order handling apparatus 100 may reflect an update of received component standard information in component standard information corresponding to assembly standard information stored in standard assembly storing unit 101 when component standard information of individual assembly information is updated. As described above, component standard information of individual assembly information stored in individual assembly storing unit 107 is mapped with version information. Assembly information updating unit 117 updates component standard information of individual assembly information according to an update request from a user. When an update is completed, assembly information updating unit 117 increases a number of a version of component standard information to update version information.

Determining unit 119 performs a comparison of component standard information. That is, determining unit 119 compares version information of component standard information corresponding to assembly standard information stored in standard assembly storing unit 101 to version information of component standard information corresponding to assembly standard information stored in individual assembly storing unit 107. By this operation, determining unit 119 monitors an update of version information. Since version information has been updated as described above, determining unit 119 determines that version information of component standard information stored in individual assembly storing unit 107 is greater in number than version information of component standard information stored in standard assembly storing unit 101. In this instance, determining unit 119 determines that component standard information of individual assembly information has been updated. Therefore, determining unit 119 urges assembly information updating unit 117 to update component standard information stored in standard assembly storing unit 101, whereby corresponding component standard information is updated.

Also, when plural individual component information having component identification information are contained in individual assembly information, output unit 111 may output error information. Display unit 115 may display the error information. Therefore, if an erroneous update request for an update of component disposition is received, order handling apparatus 100 can urge a user to deal with it. Therefore, order handling apparatus 100 can prevent an erroneous design update from being reflected in a database.

Assembly standard information may contain cost information of an assembly. Determining unit 119 receives an update of cost information received by receiving unit 105 when component standard information stored in standard assembly storing unit 101 is updated. Determining unit 119 extracts individual assembly information from individual assembly information storing unit 107 based on arranging information. Determining unit 19 compares before and after cost information for reflecting an update of cost information in extracted individual assembly information and outputs a comparison result through output unit 111.

In detail, cost information is information representing the cost required to manufacture or purchase an assembly. Assembly information generating unit 103 duplicates cost information when generating individual assembly information. Therefore, individual assembly information contains cost information.

When component standard information stored in standard assembly storing unit 101 is updated, receiving unit 105 receives an update of cost information together. Then, cost information of assembly standard information corresponding to standard assembly storing unit 101 is updated. Determining unit 119 extracts individual assembly information based on arranging information assigned to component standard information with reference to individual assembly storing unit 107. In detail, determining unit 119 extracts individual component information containing the same component standard information as updated component standard information from individual component information stored in individual assembly storing unit 107. Determining unit 119 narrows down to individual component information containing arranging information which indicates "not arranged" with reference to arranging information of extracted individual component information. Determining unit 119 extracts individual assembly information corresponding to narrowed individual component information.

Extracted individual assembly information may be listed on display unit 115 together with cost information. At this time, order handling apparatus 100 may display cost information after an update of a component together, for each individual assembly information. Therefore, a user can select whether to reflect an update of a component or not.

Determining unit 119 may compare cost information of after an update and cost information of before an update. That is, determining unit 119 may read out cost information contained in extracted individual assembly information and may compare cost information of when an update of cost information is reflected in individual assembly information and cost information of before an update of cost information is reflected in individual assembly information.

A comparison result represents a change in cost. That is, a comparison result represents how the cost of an assembly changes when an update of component standard information is collectively reflected in an assembly containing a component which is not arranged. For example, determining unit 119 computes a sum of costs represented by cost information of extracted individual assembly information. Next, determining unit 119 computes a sum of costs when an update of cost information is reflected. A comparison result is the difference between two costs. Therefore, a user can grasp how much the cost of an assembly is increased or decreased by an update of a component.

Order handling apparatus 100 may display the obtained result on display unit 115. Therefore, a user can instruct to reflect an update of component standard information. Therefore, a user can grasp a cost difference and thus select whether to reflect an update of a component or not. Also, output unit 111 may transmits an obtained cost difference to a previously set destination via e-mail. Therefore, a user can understand how the cost changes due to an update of a component which is not arranged.

Also, order handling apparatus 100 computes the cost of an assembly of before an update of cost information is reflected in individual assembly information. Order handling apparatus 100 may compute the cost difference as a comparison result. Order handling apparatus 100 may display a computed result to correspond to respective individual assembly information on display unit 115.

Therefore, a user can select whether to reflect an update of a component or not while grasping a cost difference with respect to each assembly. Order handling apparatus 100 may reflect an update of a component according to an instruction from a user.

Effects of the exemplary embodiment of the present invention are as follows.

Order handling apparatus 100 according to the exemplary embodiment of the present invention can store assembly standard information of an individual order produce together with component standard information and can store such that arranging information representing whether a component is arranged or not is assigned to component standard information contained in individual assembly information generated by duplicating assembly standard information. Therefore, when component standard information of assembly standard information is updated, order handling apparatus 100 can determine whether to reflect updated component standard information or not based on arranging information of corresponding individual component information. Therefore, for example, order handling apparatus 100 can design-update only component standard information of individual component information which is not arranged in advance. Therefore, order handling apparatus 100 can efficiently manage an advance arrangement of a component while coping with a specification update of a product in producing an individual order product.

Order handling apparatus 100 according to the exemplary embodiment of the present invention duplicates assembly standard information and component standard information which are stored in standard assembly storing unit 101, and stores duplicated assembly standard information and component standard information in individual assembly storing unit 107 by inserting them into individual assembly information. Therefore, order handling apparatus 100 can provide a function for navigating between standard assembly storing unit 101 and individual assembly storing unit 107.

Order handling apparatus 100 according to the exemplary embodiment of the present invention manages assembly standard information in a tree structure form. The tree structure represents an assembly structure of components. Order handling apparatus 100 duplicates assembly standard information to generate individual assembly information. Therefore, a user can manage an individual order product while considering the assembly of assemblies of a completed individual order product. Similarly, a user can manage an individual order product while considering the assembly of components which constitute each assembly.

Component information generating unit 109 can assign component identification information to some of plural component standard information corresponding to assembly standard information. Therefore, order handling apparatus 100 can identify a configuration-dedicated component and a standard component. Assembly standard information is configured in a tree-structure form. Therefore, in assembly standard information, order handling apparatus 100 can manage an upper level component as a configuration-dedicated component and a lower level component as a standard component.

Also, order handling apparatus 100 according to the exemplary embodiment of the present invention can have version information which represents the number of times that component standard information is updated. Therefore, order handling apparatus 100 can compare component standard information stored in standard assembly storing unit 101 and component standard information stored in individual assembly storing unit 107 based version information. Also, order handling apparatus 100 can determine that component standard information stored in one of the above storage units has been updated. Therefore, when it is determined as updated, order handling apparatus 100 can reflect an update of component standard information with respect to assembly standard information having old version information. In other words, order handling apparatus 100 can synchronize a version between standard assembly storing unit 101 and individual assembly storing unit 107. Also, order handling apparatus 100 can extract and reproduce predetermined version information. Therefore, order handling apparatus 100 can restore an erroneous update.

Order handling apparatus 100 according to the exemplary embodiment of the present invention can operate, for example, as described below. Order handling apparatus 100 manages assembly standard information in standard assembly storing unit at an initial designing stage of an individual order component. Order handling apparatus 100 can trace history of a design update by assigning version information to assembly standard information. When a design is determined at some level or when an order of a component is about to be placed, order handling apparatus 100 duplicates assembly standard information of standard assembly storing unit 101 to generate individual assembly information. When individual assembly information is design-updated, order handling apparatus 100 reflects an update in assembly standard information stored in standard assembly storing unit 101.

As a result, order handling apparatus 100 can more efficiently cope with a specification update of a component and perform an advance arrangement of a component in producing an individual order product. Also, order handling apparatus 100 can arrange a product by using assembly standard information stored in standard assembly storing unit 101 when plural orders are placed after an individual order product is test-manufactured.

Order handling apparatus 100 according to the exemplary embodiment of the present invention provides a product number managing function and thus can manage a product configuration for each product number. FIGS. 4A to 4D show an effect of order handling apparatus 100 according to the exemplary embodiment of the present invention. FIG. 4A shows an assembly of a component number A stored in standard assembly storing unit 101. The assembly includes an assembly of a component number B and an assembly of a component number C. The assembly of a component number B includes a component of a component number D. The assembly of a component number C includes a component of a component number D and a component of a component number F. In this instance, the assembly of a component number A is a product.

A first effect of the apparatus having a product managing function is that a configuration of an individual order product is managed for each a product number. Order handling apparatus 100 generates individual assembly information of an individual order product by duplicating assembly standard information of a component number A together with component standard information and assigning product numbers X01, Y01 and Y02. FIG. 4B shows individual assembly information of a product number X01. FIG. 4C shows individual assembly information of a product number Y01. FIG. 4D shows individual assembly information of a product number Y02. Component identification numbers are assigned to individual component information of component numbers A to D, but component identification numbers are not assigned to individual component information of component numbers F to K. As a result, order handling apparatus 100 can identify components of component numbers A to D as configuration-dedicated components and a component of a component number F as a standard component. A component of a component number E is added to individual assembly information of a product number X01. A component of a component number H is added to individual assembly information of component numbers Y01 and Y02. Arranging information is assigned to added components, which are managed as individual component information, respectively. Therefore, order handling apparatus 100 can manage a configuration of an individual order product for each product number.

A second effect of the apparatus having a product managing function is that arranging information is managed for each product number. As shown in FIGS. 4B and 4C, arranging information is assigned to component standard information of component numbers A to D. Arranging information assigned to component standard information of a component number A of a product number Y01 indicates "arranged". A product of a component number A is configured as a top level assembly in an individual order product of a product number Y01. Therefore, this means that all components which constitute an assembly of a component number A of a product number Y01 are completely arranged. Meanwhile, in a product of a component number A of a product number Y02, arranging information indicates "not arranged". In an assembly which constitutes a product of a component number A, arranging information of component numbers B and H indicate "not arranged". As described above, order handling apparatus 100 can manage arranging information for each product number.

A third effect of the apparatus having a product managing function is that a product configuration of the arranging moment can be managed for each product number. As shown in FIG. 4B, arranging information of a top level product (component number A) of a product number Y01 indicates "arranged". As shown in FIG. 4A, component standard data of a standard component F has been updated from a version 1 to a version 2. However, the update is not reflected in a component F of a product number Y01 which constitutes a product which is completely arranged. Therefore, order handling apparatus 100 can manage a product configuration of the arranging moment for each product number.

Also, arranging information of atop level product (component number A) of a product number Y02 shown in FIG. 4D does not indicate "arranged". In this instance, if a lower level standard component F is updated from a version 1 to a version 2 as shown in FIG. 4A, such an update is reflected in a component F of a product number Y02. A component of H:Y01-6 shown in FIGS. 4C and FIG. 4D and a component E:X01-6 shown in FIG. 4B are components added to individual assembly information directly by an instruction of a user.

As described above, order handling apparatus 100 according to the exemplary embodiment of the present invention can efficiently manage an advance arrangement of a component while coping with a specification update of a product in producing an individual order product. Therefore, order handling apparatus 100 help produce an individual order product in a short term and at a low price.

The present invention is not limited to the exemplary embodiment of the present invention and can be variously modified without departing from the spirit of the invention. In the above-described exemplary embodiment and a modification thereof, a structure of each unit has been described in detail, but the structure can be variously modified within a range for satisfying the present invention.

While this invention has been described in conjunction with the preferred embodiments described above, it will now be possible for those skilled in the art to put this invention into practice in various other manners.

What is claimed is:

1. An apparatus for handling orders comprising:
a standard assembly storing unit for storing at least one assembly standard information of assembly for products and at least one component standard information of component for said each assembly;
an assembly information generating unit for generating individual assembly information for arranging said assembly, said assembly information including assembly standard information and component standard information copied from said standard assembly storing unit;
a component information generating unit for generating component information of component in said assembly information, said component information including component standard information and arranging information, said arranging information showing whether said component is arranged;
an individual assembly storing unit for storing the individual assembly information of said assembly and the component information of said assembly; and
a determining unit for determining whether the updates of said component standard information stored in standard assembly storing unit reflect into said component standard information in said individual assembly information based on said arranged information in case said component standard information stored in standard assembly storing unit is updated, wherein said assembly standard information includes cost information of assembly,
wherein said determining unit receives the updates of cost information in case said component standard information stored in standard assembly storing unit is updated,
wherein said determining unit extracts individual assembly information based on said arranged information,
wherein said determining unit reflects said updates of cost information into said extracted individual assembly information and calculates cost information after updating,
wherein said determining unit outputs comparative results of original cost information of said assembly and calculated cost information of said assembly.

2. The apparatus for handling orders according to claim 1, wherein said determining unit reflects the updates of said component standard information into said component standard information in said assembly information in case said arranged information shows said component is not arranged.

3. The apparatus for handling orders according to claim 1, wherein said assembly standard information includes structure information of a component,
wherein said assembly information generating unit copies said structure information to individual assembly information, 4. The apparatus for handling orders according to claim 1, wherein said individual assembly information generating unit adds identifying information to said individual assembly information to identify each of individual assembly information.

5. The apparatus for handling orders according to claim 1, further comprising:
an assembly information updating unit,
wherein said assembly updating unit receives an update request of individual assembly information and said assembly identifying information, wherein said assembly updating unit updates said individual assembly information having the assembly identifying information corresponding to said received assembly identifying information.

6. The apparatus for handling orders according to claim 5, wherein said component information generating unit adds component identifying information to said component standard information to identify each of said component information,
   wherein said update request for individual assembly information includes an update request for component standard information added said component identifying information,
   wherein said assembly information updating unit updates said component standard information of said individual assembly information having the assembly identifying information and the component identifying information corresponding to said received update request for individual assembly information and said received update request for component standard information.

7. The apparatus for handling orders according to claim 6, wherein said assembly information updating unit reflects said updates of component standard information of said assembly standard information stored in said standard assembly storing unit in case said component standard information of said individual assembly information is updated.

8. The apparatus for handling orders according to claim 6, wherein error information is outputted if said individual assembly information includes a plurality of component information having the same component identifying information.

9. The apparatus for handling orders according to claim 6, wherein said component information generating unit adds said component identifying information to part of a plurality of said component standard information corresponding to said assembly standard information.

10. The apparatus for handling orders according to claim 1, wherein said standard assembly storing unit stores said component standard information with version information, said version information shows the number of updates of said component standard information,
   wherein said assembly information generating unit generates said individual assembly information copied from said assembly standard information with the version information of said component standard information,
   wherein said determining unit determines whether said component standard information stored in said standard assembly storing unit is updated based on the version information.

* * * * *